United States Patent
Kovacs et al.

(10) Patent No.: US 7,965,629 B2
(45) Date of Patent: Jun. 21, 2011

(54) SYSTEM AND METHOD PROVIDING OVERLOAD CONTROL IN NEXT GENERATION NETWORKS

(75) Inventors: Benedek Kovacs, Budapest (HU); Gabor Nemeth, Budapest (HU); Zsolt Kenesi, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 161 days.

(21) Appl. No.: 12/394,760

(22) Filed: Feb. 27, 2009

(65) Prior Publication Data

US 2010/0220587 A1    Sep. 2, 2010

(51) Int. Cl.
*H04L 1/00* (2006.01)
(52) U.S. Cl. ..... 370/230; 370/235; 370/353; 370/395.2; 709/235
(58) Field of Classification Search .......... None
See application file for complete search history.

(56) References Cited

U.S. PATENT DOCUMENTS

| | | | | |
|---|---|---|---|---|
| 5,274,644 A | * | 12/1993 | Berger et al. | 370/230 |
| 7,301,905 B1 | * | 11/2007 | Tontiruttananon et al. | 370/232 |
| 2002/0159576 A1 | * | 10/2002 | Adams | 379/133 |

FOREIGN PATENT DOCUMENTS

| | | |
|---|---|---|
| WO | WO 2005 114834 A1 | 12/2005 |
| WO | WO 2005 120087 A1 | 12/2005 |
| WO | WO 2006 082578 A1 | 8/2006 |
| WO | WO 2006 090369 A1 | 8/2006 |
| WO | WO 2006 120458 A1 | 11/2006 |
| WO | WO 2006 120462 A1 | 11/2006 |
| WO | WO 2006 126089 A1 | 11/2006 |
| WO | WO 2007 001965 A2 | 1/2007 |
| WO | WO 2007 002443 A2 | 1/2007 |
| WO | WO 2007 024335 A2 | 3/2007 |
| WO | WO 2007 064422 A2 | 6/2007 |
| WO | WO 2008 032175 A2 | 3/2008 |
| WO | WO 2008 043106 A2 | 4/2008 |
| WO | WO 2008 043390 A1 | 4/2008 |
| WO | WO 2008 043391 A1 | 4/2008 |

OTHER PUBLICATIONS

ETSI TISPAN "Telecommunications and Internet converged Services and Protocols for Advanced Networking (TISPAN); Next Generation Networks; Architecture for Control of Processing Overload" ETSI TR 182 015 v1.1.1 (Oct. 2006) Technical Report.

* cited by examiner

*Primary Examiner* — Chi H. Pham
*Assistant Examiner* — Shick Hom (57) ABSTRACT

A system, method and node for overload control in a network. The method includes the steps of receiving an incoming offer by a node, filtering the offer by an in-throttle to determine if the offer is permitted to be processed by the node prior to processing by the node, processing a permitted offer, and sending the processed offer to a designated target. After processing the permitted offer by the node, the offer may be further filtered prior to sending the offer to the designated target.

31 Claims, 6 Drawing Sheets

SYSTEM AND METHOD PROVIDING OVERLOAD CONTROL IN NEXT GENERATION NETWORKS

BACKGROUND

The present invention relates to communications networks. More particularly, and not by way of limitation, the present invention is directed to a system and method providing overload control in next generation networks.

Next Generation Networks (NGN) provide several real-time services. These services are based on a wide range of protocols over several servers. The applied protocols typically do not provide response or status codes that indicate processing overload. Furthermore, these protocols do not specify an overload control mechanism. Since the servers can experience processing overload (e.g., server failure, high rates of incoming service requests, etc.), the servers must be equipped with some form of overload detection and control.

Typically, load control is provided by building a mechanism into each protocol that needs it. However, it would be quicker and cheaper to solve this problem in a way that is independent of the protocols. A separate overload control protocol with associated load control functions called Generic Overload Control Application Protocol (GOCAP) exists, which detects processing overload, adapts and distributes restriction levels and applies restriction. The lack of overload management in NGNs is currently being addressed by the European Standards body, European Telecommunications Standards Institute (ETSI) within an architecture study within its Telecoms and Internet Converged Services and Protocols for Advanced Network (TISPAN) project. A document produced by the study, ETSI TISPAN, "Next Generation Networks; Architecture for Control of Processing Overload," ETSI TR 182 015 V1.1.1. (2006-10) describes the architectural principles that are required to provide effective control of processing overload in networks compliant to a TISPAN NGN Architecture. The scope is limited to the control of processing overload at NGN processing resources. Overload may be caused by service requests coming from session-based or command-response applications. A mechanism controls the rate at which those applications send service requests to an overloaded resource. The study does not extend to the overload of transmission bandwidth, whether used for the user plane or for the control plane.

Furthermore, the TISPAN study identifies the main problem with overload is that rejecting fresh calls takes processing effort. Thus the effective throughput at an overloaded resource (i.e., admitted service requests/sec) must eventually fall as the load offered to it is increased which causes the node to allocate its time rejecting fresh demand. To prevent this from happening, it is necessary that controls external to the resource act to decrease the fresh offered load to the level at which its effective throughput is maximized. Suggested overload control design rules include internal overload control, external overload control, priority given to session release requests, explicit demand rejection, closed loop feedback control, location of control components, automatic destination control, and Service Level Agreement (SLA) enforcement. This study describes the nodal behaviors as well as the requirements for the GOCAP. The GOCAP is proposed to define an optional parallel interface to an existing control interface which supports the real time management of dynamic transaction request peaks between components in or interfacing to the control plane of a NGN.

Within another document, ETSI TISPAN, "Control of Processing Overload; Stage 2 Requirements", ETSI TS 182 018 V2.0.0 (2008-01), it describes the specific TISPAN requirements for controls to manage overload of processing resources in NGNs. In particular, it addresses overload control between nearest neighbors.

However, current overload control algorithms throttle the call (or request) rate only after processing the messages passing through the node. There is no throttling mechanism which occurs prior to passing through the node. Therefore, existing algorithms are likely to waste valuable node resources processing messages that will never be successfully served in the end. This wastes network resources and degrades the network level capacity.

Figure 1:
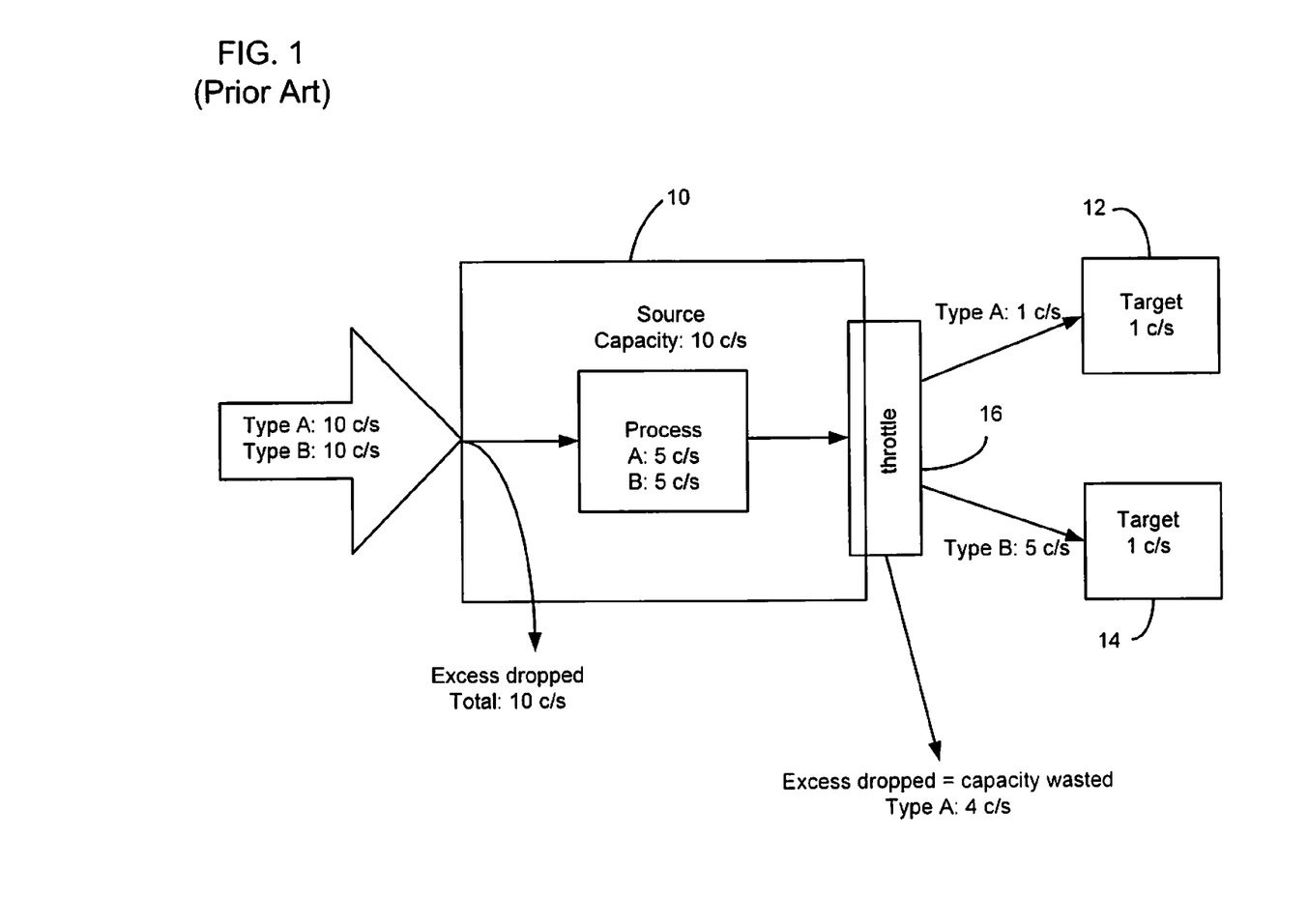
FIG. 1 (prior art) is a simplified block diagram of a control mechanism implemented in a source in an existing overload control system.

FIG. 1 is a simplified block diagram of a control mechanism implemented in a source 10 in an existing overload control system. The node, source 10, receives input traffic mix of two types: A and B, which after local processing, are intended for target 12 and target 14 respectively. If the input traffic is more than the source 10 is able to process, then the excess is dropped first through a throttle 16. However, if the input traffic mix between types A and B is significantly different from the ratio between targets 12 and 14's processing capacity, then a significant portion of the traffic admitted and processed by the source 10 will be dropped at the targets 12 and 14. Thus, the processing capacity used for these messages is wasted in the source 10.

As an example in FIG. 1, the source 10 has a capacity of 10 c/s and filters the input of 10 calls/sec (c/s) and statistically admits 5 calls/sec of both traffic types (in the same ratio as the input mix). The source then processes these 5+5 c/s. However, 4 c/s of type A destined for target 10 is considered an excess that is dropped.

There are other examples where this problem arises in other network scenarios. For example, in the Media Gateway-Telephony Softswitch Solution Gateway Control (MGW-TGC) context, which typically involves, inter-MGW calls, the off-hooks from an MGW that is overloaded are dropped more frequently than off-hooks from other MGWs. In an IP Multimedia subsystem (IMS) network, a Serving Cal Session Control Function (S-CSCF) handles both VoIP and Presence traffic and sends them to two different Application Servers (ASs). If both the ASs handling the Voice over IP (VoIP) traffic and the S-CSCF are overloaded because of the VoIP traffic, then some of the S-CSCF's processing capacity is wasted on VoIP traffic that the AS discards anyway. Another IMS scenario occurs when a Proxy CSCF (P-CSCF) node serves as a proxy for both home and roaming users. If both the AS serving the home users and the P-CSCF are overloaded, then some of the P-CSCF's capacity is spent on home user calls that will be blocked by the AS anyway, although roaming user calls in their stead still could have been served successfully by their respective home networks.

In addition, it is also feasible that the classification on the incoming side is based on the source and the classification on the outgoing side is some kind of traffic class. If the same AS handles both normal and emergency traffic at the same time, these requests arrive from different S-CSCF functional nodes (e.g., normal calls come from a CSCF, and emergency calls from an Emergency CSCF). The emergency calls could be prioritized above the normal traffic only after examining the sender S-CSCF's IP address, however such classification is not considered in current solutions.

GOCAP as a solution furthered by the ETSI TISPAN addresses some of these problems, but does have several shortcomings. GOCAP is missing the exact algorithm on how to filter the input traffic at the node's edge. As shown in FIG. 1 where the source 10 admits equal ratios (i.e., with the same filter weights), it is not optimal with wasted resources. The GOCAP's design relies on all nodes of the network to understand, propagate and act according to the control information sent by their peers. If only a single node does not follow the standard, then the whole overload control is damaged in that part of the network. GOCAP implies that a target may request different c/s limits for different traffic types. This is a problem if the source is not able to classify its input mix according to the same rules as the target, although both implement GOCAP properly. For example, an S-CSCF requests a P-CSCF to limit traffic in a particular user class, however the P-CSCF cannot determine whether any given message falls into that class.

SUMMARY

The present invention changes the overload control architecture of the nodes to include two throttles, one on the input and one on the output side of the node. The in-throttle filters the input traffic according to the perceived limits of the target nodes' processing capacities. This allows requests that would be dropped by the target nodes due to overload to be filtered prior to being processed by the node. In addition, the present invention utilizes an algorithm that sets the filter weights for the in-throttle such that the possibility of admitting to-be-dropped requests is minimized.

In one aspect, the present invention is directed at a method of overload control in a network. The method includes the steps of receiving an incoming offer by a node, filtering the offer to determine if the offer is permitted to be processed by the node, processing a permitted offer, and sending the processed offer to a designated target. After processing the permitted offer by the node, the offer may be further filtered prior to sending the offer to the designated target.

In another aspect, the present invention is directed at a system for overload control in a network. The system includes a node for processing an offer and an in-throttle for filtering the offer to determine if the offer is permitted to be processed by the node. The in-throttle filters the offer before the offer is processed by the node. The system also includes a designated target separate from the node. The processed offer is sent to the designated target. After processing, the system may also include an out-throttle to perform further filtering prior to sending the offer to the designated target.

In still another aspect, the present invention is directed at a node for overload control in a network. The node receives an incoming offer. An in-throttle filters the offer to determine if the offer is permitted to be processed by the node. The in-throttle filters the offer before the offer is processed by the main processing function of the node. The permitted offer is then fully processed by the node and sent to the designated target.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 2:
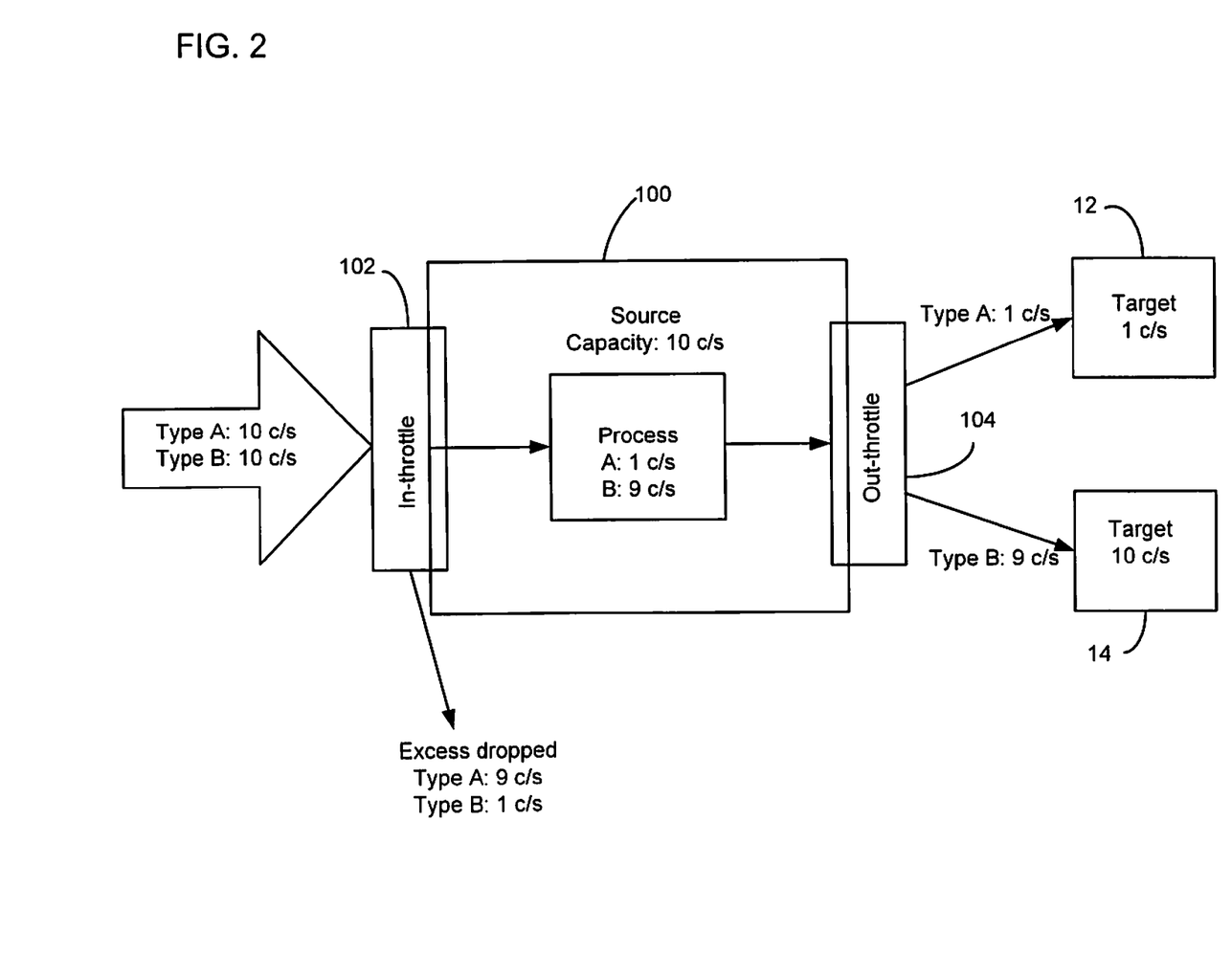
FIG. 2 is a simplified block diagram of a source node having both an in-throttle 102 and an out-throttle providing control of traffic to targets.

The present invention is a system and method providing overload control in next generation networks. FIG. 2 is a simplified block diagram of a source node 100 having both an in-throttle 102 and an out-throttle 104 providing control of traffic to the target 12 and target 14. The terms "call" and "request" are interchangeably in their meaning of a single protocol message entity that is sent, received and processed by the nodes of the network.

Normalized capacity of the node means the normalized relative capacity of the node. The call rates are the normalized relative to call rates per traffic class. There are several ways to calculate these quantities. Typically there are different request types to be served at a node, and all requires different processor capacity and may have different utility. A separate rate and utility parameter are associated with each traffic type. $c_i$ notes the absolute number of calls/sec the node can serve from request type i, and $c_i$ notes the utility of serving a call of the same type. The total capacity c of the node is then defined as a normalized quantity using the $c_i$ and $c_i$ of an arbitrary chosen request type:

$$c := c_1 u_1.$$

Then for all request types the normalization factor is calculated as $$r_i := c/(c_i u_i),$$

and the normalized call rate of request type i is $$x_i := xx_i u_i r_i,$$

where $xx_i$ is the absolute (non-normalized) call rate offered to the node (e.g. count/sec). The normalization factor for the request type is normalized to be always 1, i.e., $r_1=1$ here.

Utility is a configurable parameter expressing the relative usefulness of a given request type compared to other types. For example, utility may be the expected revenue associated with a request type. Requests generating more money probably are of higher utility for the operator. The revenue-optimizing request admittance policy may be to prioritize the requests according to their utility. Monitoring total utility of a node indicates the relative usefulness of that particular node compared to other nodes of the network. Also, given some input traffic mix, the admitted traffic may be set such that it maximizes the total utility of the node. If utility is chosen not to be considered, in the present invention, utility is set identically 1 for all request types.

For example, if class 1 and 2: $xx_1=30$ and needs 2% of processing and has a utility of $u_1=3$, while $xx_2=40$ and needs 1% and has a utility of $u_2=2$. The CPU may be used at 100% so $c_1=50$ while $c_2=100$ (any other value is sufficient for the maximum allowed CPU load). Then the total capacity of the node is $c=c_1 u_1=50 \cdot 3=150$, $r_2=c/(c_2 u_2)=150/(100 \cdot 2)=0.75$ and $x_1=xx_1 u_1 r_1=30 \cdot 3 \cdot 1=90$ while $x_2=xx_2 u_2 r_2=40 \cdot 2 \cdot 0.75=50$. The in-throttle may be able to apply different filtering weights to different traffic types. On an aggregate level, the in-throttle 102 preferably operates as a token bucket throttle. A token bucket is a common algorithm used to control the amount of data that is injected into a network, allowing for bursts of data to be sent. The in-throttle preferably has a capacity expressed in normalized call rate that is used as an upper bound for the total rate of admitted offers. In addition, the in-throttle supposes that there are different classes of offered traffic classes with different offer rates and different initial weights which are set by an external algorithm or the network operator. Whenever the rate of a traffic class is lower or equal to its weight multiplied with the capacity of the in-throttle, then the rates are fully admitted. It is possible that not all the traffic classes use their allocated minimum share of the capacity. When there would be unused capacity after allocating minimum shares for all traffic classes, the throttle may decide to partition that remaining capacity among those traffic classes that have offers above their minimum shares. The decision to do this and the algorithm for dividing remaining capacity should be configured by the operator.

The present invention also provides a methodology for setting the capacity of the in-throttle 102. This may be accomplished by configuring the in-throttle to the engineered capacity of the node. If the sum of the capacity of the targets is less than the capacity of the source node 100, then the operator may decide on setting the capacity of the in-throttle between the sum of the capacity of the targets and the capacity of the node. However, since the weights are often set using estimation, in another embodiment, the capacity of the in-throttle may be set to the capacity of the node, thereby leaving the responsibility of protecting the target from overload for the overload protection function in the targets.

Figure 3:
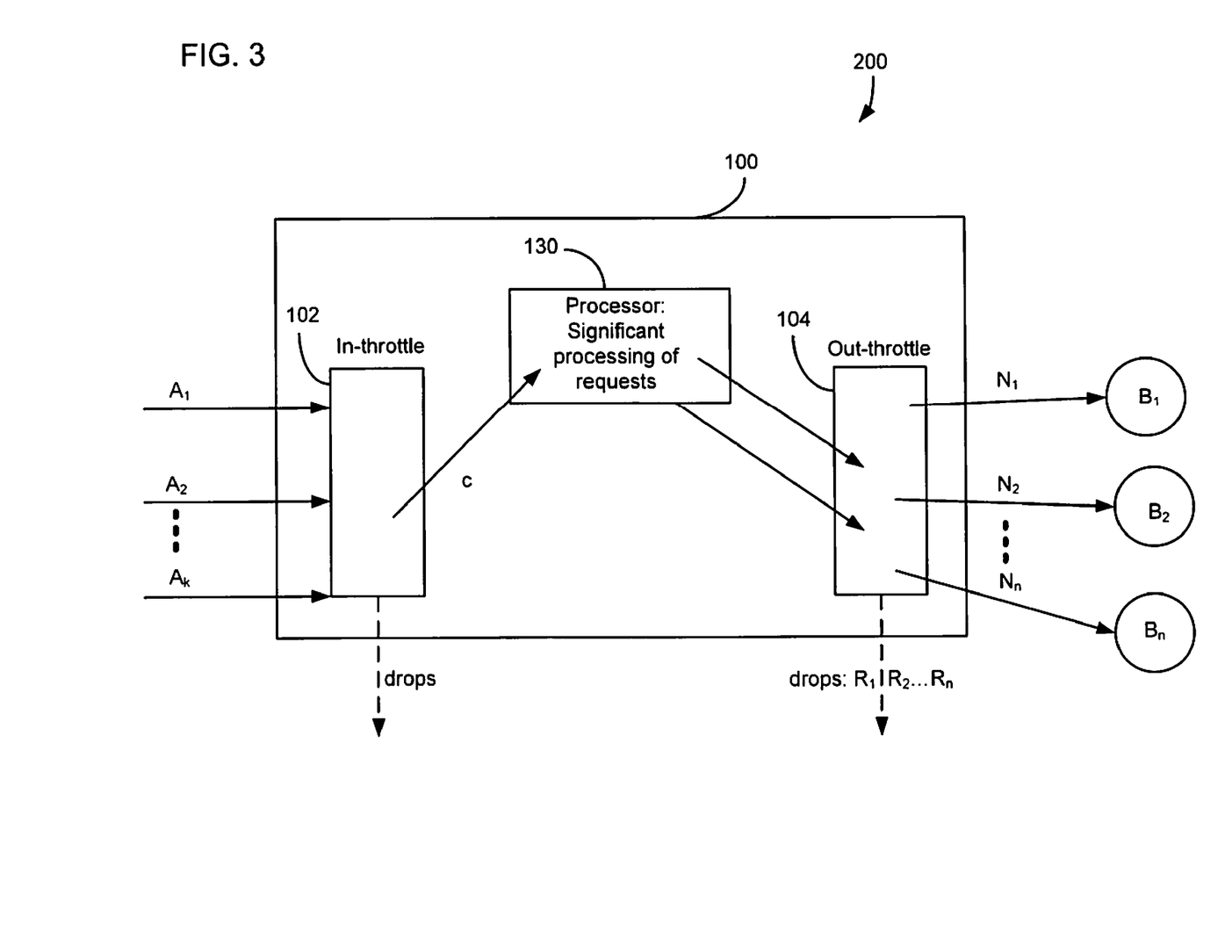
FIG. 3 is a simplified block diagram of an enhanced node overload control architecture in one embodiment of the present invention.

FIG. 3 is a simplified block diagram of an enhanced node overload control architecture 200 in one embodiment of the present invention. The architecture includes a processor 130 within the source node 100, the in-throttle 102, and the out-throttle 104. In this architecture, two different (but possibly identical) traffic classifications are defined in each node, one for the incoming and one for the outgoing traffic. The incoming classification are denoted as classes and the outgoing classification are referred to as targets. $A_i$ denotes the ith class (i=1 ... k), and $B_j$ denotes the jth target (j=1 ... n). c denotes the total normalized relative call rate admitted by the in-throttle. $N_j$ denotes the normalized relative call rate offered to the jth target by the node. $R_j$ denotes the normalized relative rate of rejected traffic for target j. In the present invention, it is the same whether the rejected traffic is rejected effectively by some other node of the network or by the out-throttle on behalf of the target nodes.

The in-throttle 102 performs weighted fair filtering of the incoming traffic. Thus, the input traffic belongs to some class $A_i$ and is assigned a minimum portion $s_i$ of the total throughput of the throttle. It is possible that not all input traffic classes use their respective minimum shares, in which case the unused capacity can optionally be divided between the other classes.

Figure 4:
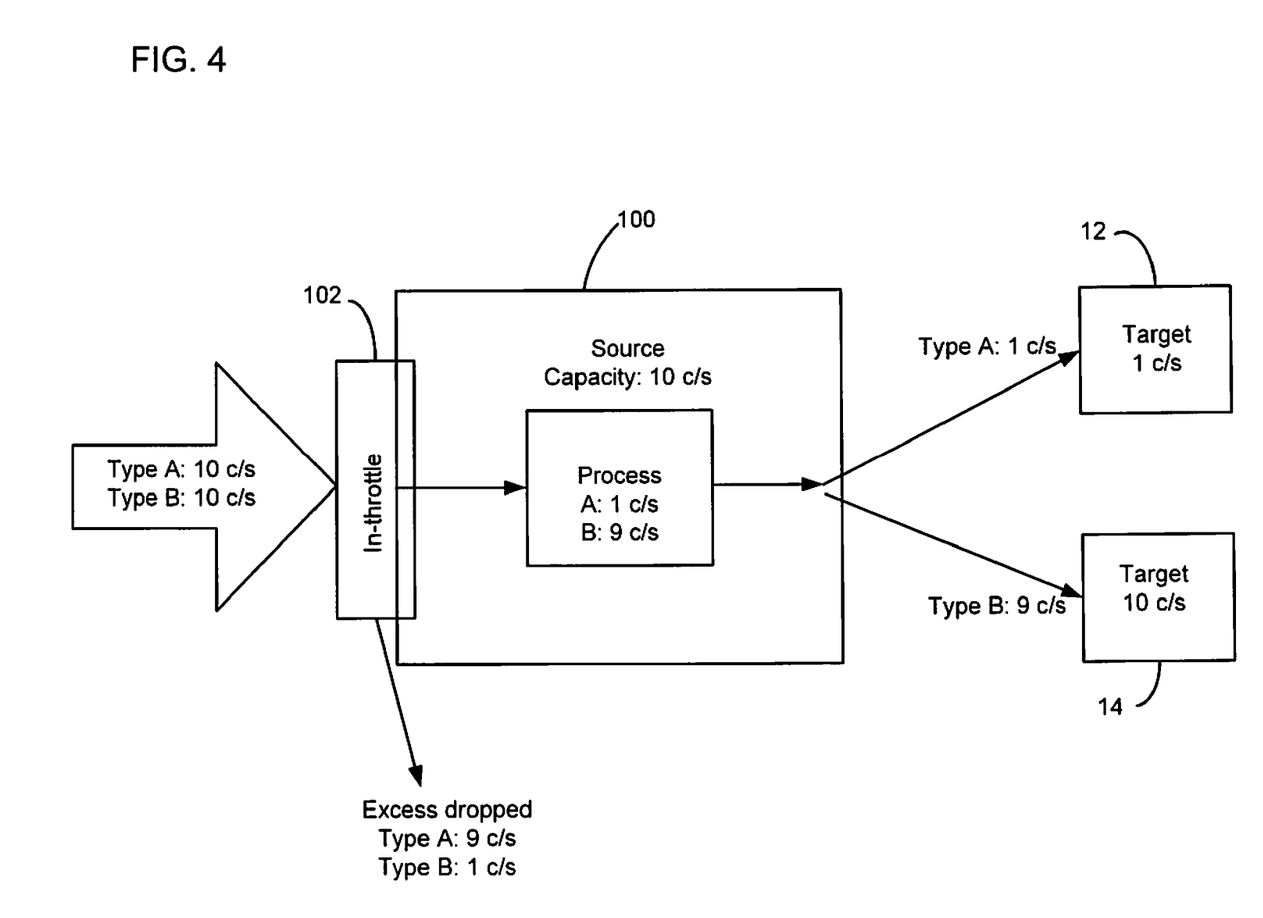
FIG. 4 illustrates a simplified block diagram where the in-throttle performs all throttle functionality in the overload protection system.

The algorithm to set the filter weights consists of two cases, based on whether the target of each incoming request is known to the in-throttle 102 or not. If the target is known, then the in-throttle is able to classify with respect to the targets. In many network situations, the node is able to determine the target of the requests prior to full processing of the request, i.e., in the in-throttle. In this case, the filter weights are preferably set according to the targets' capacities. Thus, the in-throttle 102 is equivalent to the out-throttle 104. Therefore, the complete overload protection throttle functionality is implemented in the in-throttle 102, while the out-throttle 104 is missing. FIG. 4 illustrates a simplified block diagram where the in-throttle performs all the overload protection throttle functionality. Thus, the out-throttle's functionality is implemented in the in-throttle 102 before significant processing is accomplished.

In the preferred embodiment of the present invention, the filter weights in the in-throttle are the same as the weights of the out-throttle in existing systems. Preferably, the weights are set according to the capacities of their targets. If processing of the requests after admission by the in-throttle takes longer than the typical time of rapid changes of the overload state of targets, then an out-throttle is preferably utilized. There are various ways to obtain the capacity limits of the targets. For example, the weights may be set to constants during network configuration by the operator. The capacities of the targets may be communicated explicitly by the targets (e.g., targets 12 and 14) via a specialized overload control protocol (like GOCAP). In this case the weights could be updated dynamically. In addition, the source node 100 may measure the throughput to the different targets and extrapolate from those measurements regarding the targets' capacities.

In the preferred embodiment of the present invention, the throttle function is implemented as early as possible to avoid unnecessary processing. However, in another embodiment, it may be necessary to provide as much reaction time of the overload control mechanism as possible. In this case, the throttle is implemented only at the very last possible stage of the call processing.

If the in-throttle 102 is unable to determine the target of the requests, but still is able to assume that there is significant correlation between the incoming and outgoing classifications (i.e., between classes and targets), the present invention, as detailed in the method below, will improve the utilization of the source node 100.

In the present invention, bounds for $s_i$ weights that determine the valid range of values are set. Next, rules that determine on what conditions the weights should be increased or decreased are provided. A dynamic algorithm is then implemented that is utilized in conjunction with the bounds and rules.

There are two bounds for the filter weights $s_i$ that affect the range of values the weights can take during the algorithm operation. Both bounds are preferably configured at algorithm initialization. A soft upper bound $s_{imax}$ for each $s_i$ weight is defined. This is the desirable filter weight for incoming traffic class i. A soft bound allows the algorithm to increase the actual value of $s_i$ above this bound on certain conditions. The default may be such that the source node 100 treats all incoming traffic classes the same way and gives them equivalent shares from the capacity i.e. set $s_{imax}=c/n$ for all i by default. In addition, a hard lower bound $s_{imin}$ for each traffic class is defined. For example, this might be a Service Level Agreement (SLA) criterion (e.g., a minimum share to be assigned to a certain traffic class) or simply 0 in the absence of any such criteria. The weightless throttling is the same as setting all $s_{imax}=0$ while $s_{dmax}=1$ for a dummy class and the all the incoming traffic would then have the portion as the offered rate. In this case, the $s_i$ values do not stay at 0. The hard lower bound however is preferably implemented in such a way that if there are no admitted offers of a given class for a specified time period, then the throttle allows a single one from that class to pass. This principle of allowing the single request to pass through for the hard lower bound because, without this principle, the control as a stable point at 0 (i.e., once a weight reaches zero, would never change). The actual value of the specified time period is a configurable parameter to be set at algorithm initialization, such as 5 seconds.

The present invention provides equivalence criteria for $s_i$. For each target (i.e., output class) i, a notation for the rest of the traffic (i.e., the total normalized call rate offered to every target except the ith) is defined as:

$$M_i := \sum_{j \neq i} N_j$$

While the rest of the rejected traffic is defined as:

$$P_i := \sum_{j \neq i} R_j$$

In addition, the per-target served-offered ratio is defined as the portion of served requests from the total offered rate for that target and represented by:

$$q_i := (N_i - R_i)/N_i$$

The same ratio for the remaining traffic is defined as:

$$p_i := (M_i - P_i)/M_i.$$

The present invention, through the algorithm strives to reach the state where $q_i = p_i$ for all traffic classes. Otherwise, traffic i would use more capacity than it is practical because it is rejected relatively more often in the environment than the others. However, in one embodiment, the network operator sets an interval in which these values can move. This allows the entire system to be more robust, and thus not react to small temporary problems. Therefore, the present invention, through the algorithm strives to achieve the following inequalities: $q_i - E_1 < p_i < q_i + E_2$ and $E_1 > 0$, $E_2 > 0$, where $E_1$ and $E_2$ are parameters configurable at method initialization.

In one embodiment, rules are implemented for each class i. First, where there is a significant difference of q and p, if $q_i < p_i + E_1$, then $s_i$ is decreased until: $S_i = S_{imin}$ or $q_i - E_1 < p_i < q_i + E_2$. If q and p are equivalent, if $q_i - E_1 < p_i < q_i + E_2$, then $s_i$ is increased until $s_i = s_{imax}$ or $q_i < p_i$.

The algorithm changes the $s_i$ weights according to the rules and bounds. It should be understood that any algorithm may be utilized that adheres to the above defined bounds and ranges. In another embodiment, successive approximation or any congestion control algorithm applied in various Transmission Control Protocol (TCP) versions may be used.

Figure 5:
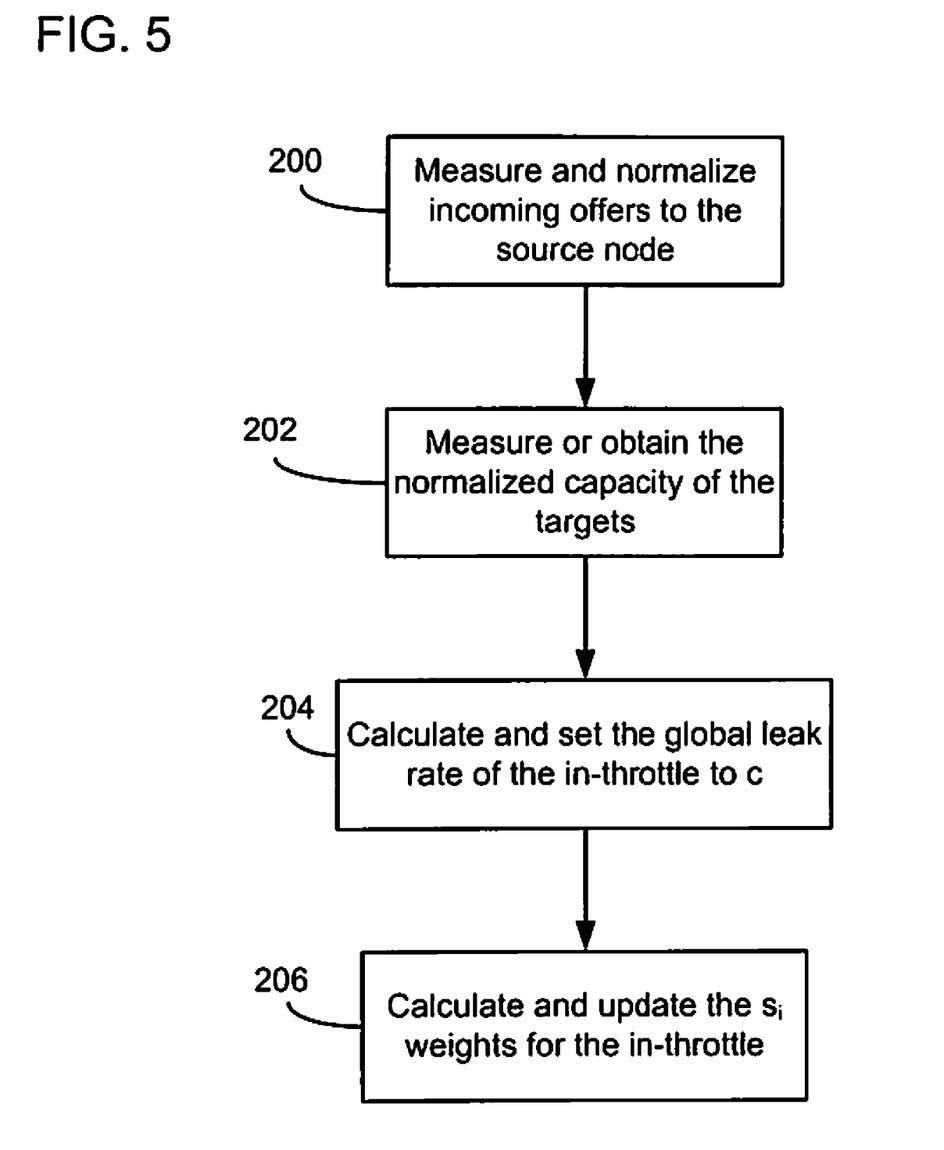
FIG. 5 is a flow chart illustrating the steps for updating the weights of the in-throttle according to the teachings of the present invention.

As discussed above, the weights of the in-throttle may be set by constant settings by the operator, using capacity values known either from the source node self-measurements or from an arbitrary overload control protocol running between the source node 100 and its targets 12 and 14, or by using the proposed weight setting method discussed above. FIG. 5 is a flow chart illustrating the steps for updating the weights of the in-throttle 102 according to the teachings of the present invention. With reference to FIGS. 2-5, the method will now be explained. The method begins in step 200 where incoming class-wise offers to the source node 100 are measured and normalized. An estimate of the rate-based call gapping throttle may be used. Next, in step 202, the normalized capacity of the targets 12 and 14 are measured or obtained. In step 204, the global leak rate of the incoming throttle to c is calculated and set. Next, in step 206, the $s_i$ weights for the in-throttle are calculated and updated as discussed above.

Figure 6:
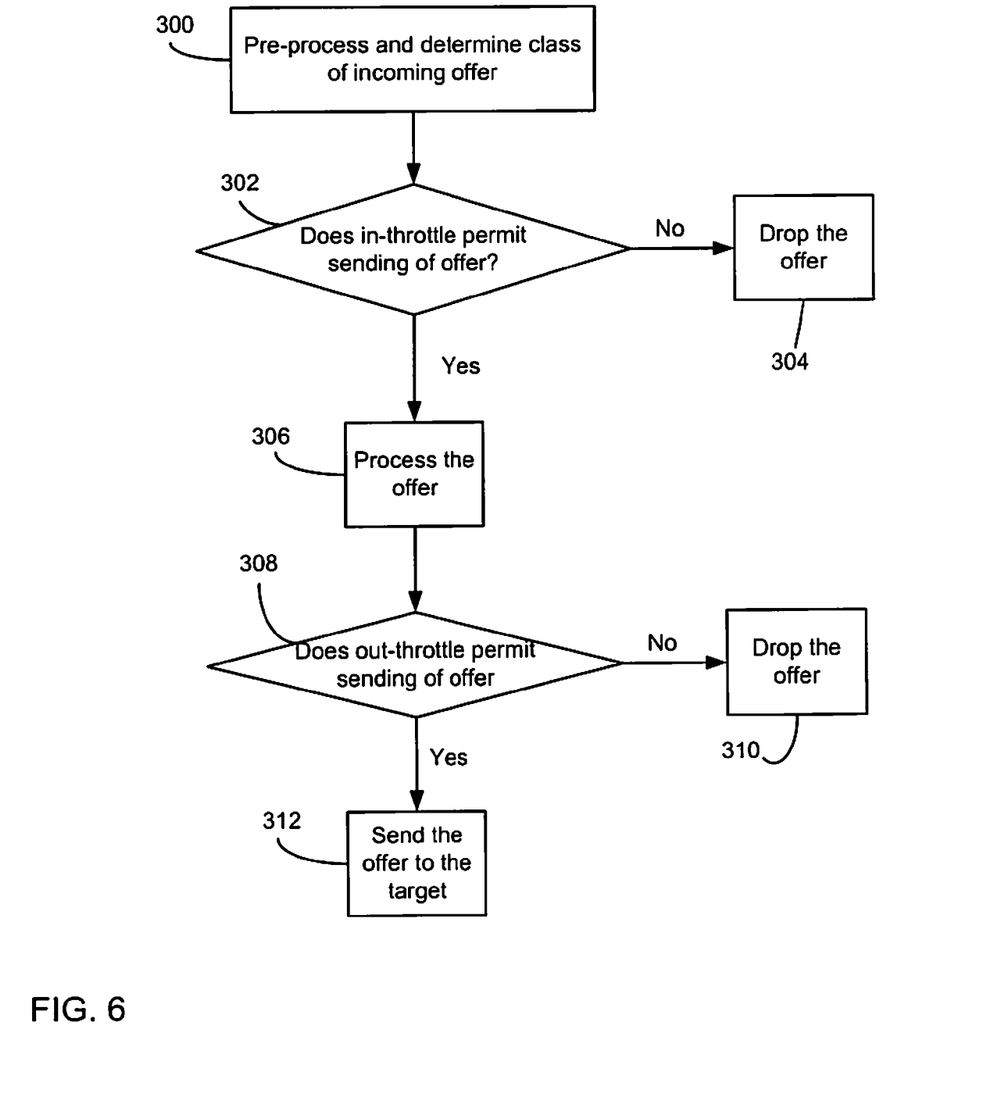
FIG. 6 is a flow chart illustrating the steps of throttling offers to the source node according to the teachings of the present invention.

In existing systems, throttling only is provided for outgoing offers from the source node. There is no in-throttling implemented in these existing systems. In contrast to existing systems, the present invention provides in-throttling for incoming offers. FIG. 6 is a flow chart illustrating the steps of throttling offers to the source node 100 according to the teachings of the present invention. With reference to FIGS. 2-6, the method will now be explained. The method begins in step 300 where an incoming offer to the source node 100 is pre-processed and a class is determined. The in-throttle 103 maximizes the throughput at the source node by filtering the incoming offers. In step 302, the in-throttle 102 determined if the request (offer) is permitted to be processed by the processor 130 of the source node 100. If it is determined that the offer is not permitted in step 302, the offer is dropped in step 304. However, if it is determined in step 302 that the offer is permitted by the in-throttle 102, the offer is processed by the source node 100 in step 306. The determination of whether the offer is permitted by the in-throttle is determined by the filter weights implemented in the in-throttle as discussed above. After the source node 100 processes the offer, the out-throttle 104 may optionally protect the targets by determining if the out-throttle 104 permits the sending of the offer from the source node 100 in step 308. If it is determined that the out-throttle 104 does not permit the sending of the offer, the offer is dropped in step 310. However, in step 308, if it is determined that the out-throttle permits the sending of the offer, the offer is sent to the designated target 12 or 14 in step 312.

In another embodiment, the throttle may be replaced with a GOCAP-like distributed control algorithm (so the throttling can be done in the source of the streams, such as in the source of the source node), if the sender can classify the traffic in the same way the source node desires. In addition, the present invention may enhance the system by observing returned calls to determine capacity utilization. The classification of the streams may be based on source node, traffic type or anything else, both on the incoming and the outgoing side. The present invention may be applied in a situation where both the incoming and outgoing classification is known by only the source node itself.

The present invention provides many advantages over existing systems. By utilizing an in-throttle on the incoming side of the source node, the capacity of the source node is increased. Throttling is accomplished before the full processing of requests, which decreases the waste of capacity. In existing systems, the source node fully processes the request to determine the target. In contrast, the present invention preferably assumes that there is a correlation between the incoming traffic class of the request and its target, and thereby apply weights to the throttle according to the estimation of this correlation. If the traffic classes are indeed correlated with the targets to some degree, the present invention provides an enhanced capability in comparison to a random selection of admitted (and processed) requests because it takes the perceived capacity of the targets into account. In addition, the present invention provides an intelligent throttle with weights allowing fairness for the offered streams to the source node. The present invention optimizes the utilization for the node and its environment without requiring cooperation of the peers.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

The invention claimed is:

1. A method of overload control in a network, the method comprising the steps of:
   receiving an incoming offer by a node;
   filtering the offer by an in-throttle, to determine if the offer is permitted to be processed by the node, the in-throttle filtering the offer according to a perceived limit of the designated target of the offer before the offer is processed by the node;
   processing a permitted offer; and
   sending the processed offer to a designated target, wherein the perceived limit of the designated target of the offer is not known and a correlation is assumed to exist between a first class of traffic of the incoming offer prior to processing and a second class of traffic after processing.

2. The method according to claim 1 wherein the step of filtering includes determining a class of traffic of the incoming offer.

3. The method according to claim 2 wherein the step of filtering includes applying a specific filtering weight according to the determined class of traffic.

4. The method according to claim 2 wherein the step of filtering includes dynamically setting filtering weights based on the class of traffic of the incoming offer.

5. The method according to claim 1 further comprising the step of dropping the offer if the step of filtering the offer determines that the offer is not permitted to be processed by the node.

6. The method according to claim 1 wherein the perceived limit of the designated target of the offer is a known limit of the target.

7. The method according to claim 1 wherein the step of filtering includes setting bounds for filtering weights for the class of service of the incoming offer.

8. The method according to claim 7 wherein the set bounds are changed based on designated rules.

9. The method according to claim 8 further comprising the steps of:
   measuring and normalizing the incoming offer;
   measuring or gathering information on normalized capacity of the designated target; and
   calculating and updating filter weights according to the steps of measuring the incoming offer and normalized capacity of the designated target.

10. The method according to claim 1 further comprising, after processing the offer, the step of filtering the processed offer to determine if the offer is permitted to be sent to the designated target.

11. The method according to claim 10 further comprising the step of dropping the offer if the step of filtering the processed offer determines that the offer is not permitted to be sent.

12. A system for overload control in a network, the system comprising:
    a node for processing an offer;
    means in the node for receiving an incoming offer;
    an in-throttle for filtering the incoming offer to determine if the incoming offer is permitted to be processed by the node, the in-throttle filtering the offer before the offer is processed by the node, wherein the in-throttle includes means for filtering according to a perceived limit of the designated target of the offer;
    a designated target separate from the node; and
    means for sending the processed offer to the designated target, wherein the perceived limit of the designated target of the offer is not known and a correlation is assumed to exist between a first class of traffic of the incoming offer prior to processing and a second class of traffic after processing.

13. The system according to claim 12 wherein the in-throttle includes means for determining a class of traffic of the incoming offer.

14. The system according to claim 13 wherein the in-throttle includes means for applying a specific filtering weight according to the determined class of traffic.

15. The system according to claim 13 wherein the in-throttle includes means for dynamically setting filtering weights based on the class of traffic of the incoming offer.

16. The system according to claim 12 wherein the in-throttle includes means for dropping the offer if the in-throttle determines that the offer is not permitted to be processed by the node.

17. The system according to claim 12 wherein the perceived limit of the designated target of the offer is a known limit of the target.

18. The system according to claim 12 wherein the in-throttle includes means for setting bounds for filtering weights for the class of service of the incoming offer.

19. The system according to claim 18 wherein the set bounds are changed based on designated rules.

20. The system according to claim 19 wherein the in-throttle includes:
    means for measuring and normalizing the incoming offer;
    means for measuring or gathering information on normalized capacity of the designated target; and
    means for calculating and updating filter weights according to the steps of measuring the incoming offer and normalized capacity of the designated target.

21. The system according to claim 12 further comprising an out-throttle having means for filtering the processed prior to sending the offer to the designated target.

22. The system according to claim 21 wherein the out-throttle includes means for dropping the offer if the out-throttle determines that the offer is not permitted to be sent.

23. A node for overload control in a network, the node comprising:
    means for receiving an incoming offer by the node;
    an in-throttle for filtering the offer to determine if the offer is permitted to be processed by the node, the in-throttle filtering the offer before the offer is processed by the node, wherein the in-throttle includes means for filtering according to a perceived limit of the designated target of the offer;
    means for processing the offer; and
    means for sending the processed offer to a designated target, wherein the perceived limit of the designated target of the offer is not known and a correlation is assumed to exist between a first class of traffic of the incoming offer prior to processing and a second class of traffic after processing.

24. The node according to claim 23 wherein the in-throttle includes means for determining a class of traffic of the incoming offer.

25. The node according to claim 24 wherein the in-throttle includes means for dynamically setting filtering weights based on the class of traffic of the incoming offer.

26. The node according to claim 23 wherein the in-throttle includes means for dropping the offer if the in-throttle determines that the offer is not permitted to be processed by the node.

27. The node according to claim 23 wherein the in-throttle includes means for setting bounds for filtering weights for the class of service of the incoming offer.

28. The node according to claim 27 wherein the set bounds are changed based on designated rules.

29. The node according to claim 28 wherein the in-throttle includes:

means for measuring and normalizing the incoming offer;

means for measuring or gathering information on normalized capacity of the designated target; and means for calculating and updating filter weights according to the steps of measuring the incoming offer and normalized capacity of the designated target.

30. The node according to claim 23 further comprising an out-throttle having means for filtering the processed prior to sending the offer to the designated target.

31. The node according to claim 30 wherein the out-throttle includes means for dropping the offer if the out-throttle determines that the offer is not permitted to be sent.

* * * * *